US010810375B2

(12) United States Patent
Mass et al.

(10) Patent No.: US 10,810,375 B2
(45) Date of Patent: Oct. 20, 2020

(54) AUTOMATED ENTITY DISAMBIGUATION

(71) Applicant: International Business Machines Corporation, Armonk, NY (US)

(72) Inventors: Yosi Mass, Tel Aviv (IL); Amir Menczel, Ashdod (IL); Dafna Sheinwald, Nofit (IL); Ilya Shnayderman, Jerusalem (IL); Noam Slonim, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 16/029,605

(22) Filed: Jul. 8, 2018

(65) Prior Publication Data

US 2020/0012719 A1   Jan. 9, 2020

(51) Int. Cl.
*G06F 40/30* (2020.01)
*G06F 40/295* (2020.01)
(Continued)

(52) U.S. Cl.
CPC .......... *G06F 40/295* (2020.01); *G06F 40/247* (2020.01); *G06F 40/253* (2020.01); *G06F 40/30* (2020.01)

(58) Field of Classification Search
CPC ...... G06F 40/30; G06F 19/328; G06F 40/169; G06F 19/00; G06F 16/90344; G06F 16/951; G06F 40/284; G06F 40/20; G06F 40/205; G06F 40/216; G06F 16/2455; G06F 16/29; G06F 40/10; G06F 40/279; G06F 16/33; G06F 16/3344; G06F 16/248; G06F 16/338; G06F 16/9535; G06F 21/55; G06F 3/04842; G06F 16/9566; G06F 16/783; G06F 16/7837; G06F 16/93; G06F 16/9577; G06F 16/972; G06F 21/6218; G06F 3/0481; G06F 40/295; G06F 16/00; G06F 16/113; G06F 16/13; G06F 40/134; G06F 16/24; G06F 16/245; G06F 16/2465; G06F 16/30; G10L 15/26; G10L 15/063;
(Continued)

(56) References Cited

U.S. PATENT DOCUMENTS 9,418,155 B2   8/2016   Shah et al.
9,633,009 B2   4/2017   Alexe et al.
(Continued)

FOREIGN PATENT DOCUMENTS

CN   105760363   7/2016

OTHER PUBLICATIONS

Mihalcea, "Using Wikipedia for Automatic Word Sense Disambiguation", Proceedings of NAACL HLT, 2007, pp. 196-203.
(Continued)

*Primary Examiner* — Huyen X Vo
(74) *Attorney, Agent, or Firm* — Dvir Gassner

(57) ABSTRACT

A method comprising: operating at least one hardware processor for: receiving, as input, at least one named entity, modifying said named entity based on a plurality of modification rules to generate a set of candidate named entities corresponding to said named entity, and identifying, for at least one candidate named entity in said set of candidate named entities, an article in a knowledge base of articles, wherein a title of said article matches said candidate named entity.

17 Claims, 3 Drawing Sheets

(51) Int. Cl.
*G06F 40/247* (2020.01)
*G06F 40/253* (2020.01)

(58) Field of Classification Search
CPC ... G10L 15/18; G10L 2015/228; G10L 15/10; G10L 15/14; G10L 15/19; G10L 2015/0633; G10L 2015/0635; G10L 15/1822; G10L 15/183; G10L 15/197; G10L 2015/221; G10L 15/1815; G10L 15/00; G10L 15/265
See application file for complete search history.

(56) References Cited

U.S. PATENT DOCUMENTS

| | | | | |
|---|---|---|---|---|
| 2010/0076972 | A1* | 3/2010 | Baron | G06F 16/355 707/736 |
| 2013/0132365 | A1* | 5/2013 | Chang | G06Q 30/0241 707/710 |
| 2013/0158983 | A1* | 6/2013 | Jakubik | G06F 40/40 704/9 |
| 2018/0225576 | A1* | 8/2018 | Pappu | G06N 5/04 |

OTHER PUBLICATIONS

Daiber et al., "Improving Efficiency and Accuracy in Multilingual Entity Extraction", I-SEMANTICS '13 Proceedings of the 9th International Conference on Semantic Systems, 2013, pp. 121-124.
Ferragina et al., "Fast and Accurate Annotation of Short Texts with Wikipedia Pages", IEEE Software, 2012, vol. 29, Issue 1, pp. 70-75.

\* cited by examiner

AUTOMATED ENTITY DISAMBIGUATION

BACKGROUND

The invention relates to the field of natural language processing.

In natural language processing (NLP), tasks such as entity linking, named entity linking (NEL), named entity disambiguation (NED), named entity recognition and disambiguation (NERD), or named entity normalization (NEN), relate to ways of determining the identity of entities mentioned in unstructured text.

Extracting such information is essential for various NLP applications, such as question answering, searches, argument construction, and more. In some cases, entity disambiguation can be done via linking to a knowledge base (for example, Wikipedia, The Free Encyclopedia, available online at http://www.wikipedia.org). Thus, given a spotted term in an input text and related a knowledge base article, the term can be disambiguated, based, e.g., on surrounding context in the input text.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising operating at least one hardware processor for: receiving, as input, at least one named entity, modifying said named entity based on a plurality of modification rules to generate a set of candidate named entities corresponding to said named entity, and identifying, for at least one candidate named entity in said set of candidate named entities, an article in a knowledge base of articles, wherein a title of said article matches said candidate named entity.

There is also provided, in accordance with an embodiment, a system comprising at least one hardware processor; and a non-transitory computer-readable storage medium having stored thereon program instructions, the program instructions executable by the at least one hardware processor to: receive, as input, at least one named entity, modify said named entity based on a plurality of modification rules to generate a set of candidate named entities corresponding to said named entity, and identify, for at least one candidate named entity in said set of candidate named entities, an article in a knowledge base of articles, wherein a title of said article matches said candidate named entity.

There is further provided, in accordance with an embodiment, a computer program product comprising a non-transitory computer-readable storage medium having program instructions embodied therewith, the program instructions executable by at least one hardware processor to: receive, as input, at least one named entity, modify said named entity based on a plurality of modification rules to generate a set of candidate named entities corresponding to said named entity, and identify, for at least one candidate named entity in said set of candidate named entities, an article in a knowledge base of articles, wherein a title of said article matches said candidate named entity.

In some embodiments, the method further comprises operating said at least one hardware processor for, and in the case of the system and computer program product, the program instructions further comprise, receiving, as further input, a text which includes said at least one named entity; and manipulating the text such that the at least one named entity included therein is a hyperlink to said article in the knowledge base.

In some embodiments, the method further comprises operating said at least one hardware processor for, and in the case of the system and computer program product, the program instructions further comprise, generating said input by spotting n-grams in an input text, based on one or more specified n-gram lengths.

In some embodiments, the method further comprises operating said at least one hardware processor for, and in the case of the system and computer program product, the program instructions further comprise, reducing a number of said n-grams in said input, by applying one or more filters selected from the group consisting of: eliminating n-grams that begin or end with a stop word, eliminating n-grams that cross a comma, eliminating n-grams comprising a grammatical article, eliminating n-grams that begin with a hyphen, and eliminating n-grams that end with a hyphen.

In some embodiments, the modification rules are selected from the group consisting of: removing plural suffixes; removing possessive suffixes; removing definite and indefinite articles; using synonyms and/or antonyms; and capitalizing and/or decapitalizing various combinations of letters in the named entity.

In some embodiments, the identifying comprises identifying a first article which redirects to said article.

In some embodiments, the knowledge base comprises at least two articles corresponding to said candidate named entity, wherein said identifying is based, at least in part, on scoring each of said at least two articles based on a number of links to each of said articles in other articles in the knowledge base.

In some embodiments, the method further comprises operating said at least one hardware processor for constructing an offline representation of said knowledge base, said offline representation comprising a set of named entities and links to their corresponding articles within said knowledge base, wherein said identifying comprises identifying an article in said offline representation.

In some embodiments, the knowledge base is a crowd-sourced knowledge base.

In some embodiments, the knowledge base comprises a structured semantic representation of another knowledge base.

In some embodiments, the knowledge base is selected from the group consisting of Wikipedia, DBpedia, and Yago2.

In some embodiments, in said knowledge base, said titles of said articles are selected based, at least in part, on a crowd-sourced consensus-based selection methodology, wherein said consensus-based selection methodology is further based, at least in part, on one or more considerations selected from the group consisting of: recognizability, naturalness, precision, conciseness, and consistency.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
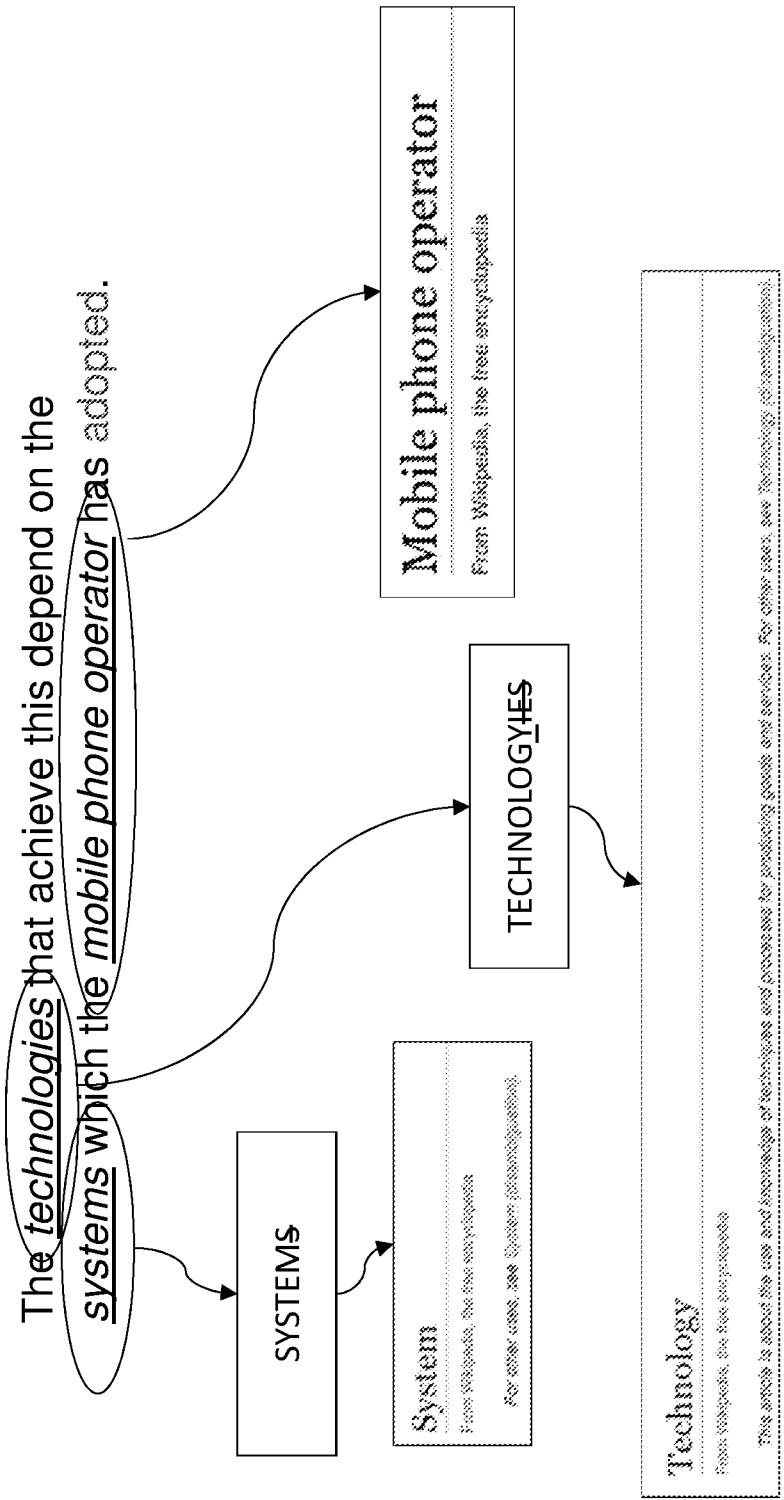
FIG. 1 shows an example of a transformation process of spotted terms, according to an embodiment.

Disclosed herein are systems, methods, and computer program products for disambiguating a spotted named entity term in an input text to its most appropriate meaning in a knowledge base, such as Wikipedia (available online at www.wikipedia.org). In some embodiments, the present invention is configured for disambiguating a named entity without relying on contextual information derived from the text. In some embodiments, the present invention provides for a two-step process in which (i) one or more named entities (also known as 'spots') may be spotted in an unstructured text, and (ii) the named entities are each disambiguated to their respective proper meanings in the knowledge base.

This process of 'Wikification,' or mention detection, is a fundamental step in semantic understanding of unstructured text and, is needed in various natural language processing (NLP) applications that operate on large collections, such as information retrieval, question answering, argument construction, compliance, and more. Known mention detection tools typically rely, at least partly, on contextual methods, such as link analysis to other spots in the text, and/or text-based similarity measures to other spots in the text. As a result, those tools may require extensive computational resources, which increase with the volume of data to be analyzed, and are thus not easily scalable.

A potential advantage of the present invention is, therefore, in that it provides for automated unsupervised named-entity disambiguation in an unstructured text, with both high recall and accuracy, without relying on textual context computations. In some embodiments, the present invention is configured for linking disambiguated named-entities in the unstructured text via hyperlinks to the corresponding articles in the knowledge base. In that sense, the present invention may operate as a 'Wikifier,' which can be used as an efficient offline tool to annotate very large collections. Furthermore, because the present invention does not rely on textual analysis and does not require extensive contextual computations, it is readily scalable to larger volumes of data. In addition, it may be used to annotate short or poorly-composed texts (such as snippets of search engine results, curtailed messages, news, and so on) with high accuracy.

As used herein, "knowledge base" refers to a semantic knowledge base of concepts and their relationships. A knowledge base suitable for using in conjunction with the present invention advantageously comprises a large collection of hyperlinked articles (or more generally, documents) about various topics, providing a type of online encyclopedia. In the knowledge base, each article may be identified by its title, typically one or more words which represent the most common name for the entity described in the article.

In the context of this invention, the term "article" is used broadly to refer to any web documents, images, multimedia files, text documents, PDFs, and so forth. An article may also be referred to as a "page," as commonly used to refer to documents on the Internet. The present invention may operate over a large corpus of articles, such as the Internet and World Wide Web, but can likewise be used in more limited collections, such as for the document collections of a library or private enterprises.

In the context of a knowledge base, some entity names may be ambiguous, in that they can refer to different instances of the same class of things, or even different classes of things. An ambiguous name can refer to two or more different articles in the knowledge base. Accordingly, the knowledge base may further include, for each ambiguous name, e.g., a 'disambiguation page' which lists all named entity articles that may be denoted by a particular ambiguous entity name.

In addition, articles in a knowledge base will often contain mentions of named entities for which there exist corresponding named entity articles. When a named entity of this sort is mentioned, the name of that named entity is linked via a hyperlink to the corresponding named entity article.

In some knowledge bases, a redirect article may exist for each alternative name that can be used to refer to a named entity in the knowledge base. The alternative name is used as the title of the article, and the article contains a redirect link to the actual named entity article that is about the entity. An alternative name may also be understood as an alias of the entity's name. An alternative name can include a synonym, misspelling, or alternative spelling, acronym, common name, full name, slang name, translation, or any other way of designating the particular entity. For example, an entity that can have many redirect pages is the named entity "United States." Redirect pages may also be used for misspellings of titles (e.g., "Untied States"), acronyms (e.g., "USA", "U.S.", "U.S.A."), as well as translations in foreign languages, and/or synonyms (e.g., "America").

The following discussion will focus on embodiments of the present invention configured to use Wikipedia as a knowledge base, in view of Wikipedia's large and growing number of articles (currently, the English Wikipedia has over 5,600,000 articles comprising over 3.5 billion words) and relatively robust disambiguation, redirecting, and inter-relational hyperlinking structure. However, other semantic knowledge bases, such as DBpedia (wiki.dbpedia.org) or Yago2 (www.mpi-inf.mpg.de/departments/databases-and-information-systems/research/yago-naga/yago) may also be used.

In computational linguistics, named entity disambiguation, also known as word-sense disambiguation, is the task of extracting semantic information from unstructured text. Disambiguation means identifying which one of multiple possible meanings of a word is used in a text. Extracting named entity meaning is an essential part of successful NLP applications, such as text classification and categorization, improving relevance of search engines, part-of-speech tagging, semantic parsing and question answering, machine translation, and speech recognition.

Term disambiguation typically involves a first step of spotting, in a given text, terms which may represent named entities. This task is often referred to as named-entity recognition (NER). A named entity (NE) is a specific linguistic item, such as a proper name, the name of a country, location, general concept, etc. NER, in general and in the context of NLP, poses a number of problems. For example, the number of NEs in a given domain may be very large, which may lead to increased complexity and higher error rate. Some NEs may have a rigid meaning while others may have a context-dependent meaning. For example, the "United States" may only refer to a specific entity, but "president" can be used to refer to many different entities in various domains—e.g., in different countries. Other difficulties may involve NEs that are not recognized lexical terms found in standard dictionaries, or NEs which may be referred to in many different ways (e.g., a person may be referred to by a first name, a last name, initials, a nickname, or a combination of these).

Given a recognized named entity in a text (also known as a 'spot'), a subsequent task is that of disambiguation of the named entity. There are several methods for disambiguation. For example, supervised and semi-supervised methods may make use of a secondary source of knowledge, such as a sense-annotated corpus, to train a machine-learning classifier. In other cases, disambiguation can rely on a knowledge base, such as one or more dictionaries, thesauri, and/or lexical knowledge bases, without using any corpus-based evidence. Thus, for example, disambiguation can resolve mentions in text to corresponding nodes in a semantic knowledge base. The complete process—spotting followed by disambiguation—may be termed 'mention detection.'

In some embodiments, the present invention is configured for generating a 'Wikified' version of on an input text, by automatically linking spotted terms in the input text to Wikipedia (or another similar knowledge base) articles corresponding to these terms.

In some embodiments, the present invention is based on the observation that, in many cases, a disambiguated entity matches the most common, frequently-used sense of that entity. In many of these cases, the most frequently used sense of the word is expressed as the knowledge base article title for that named entity. It should be noted that, in the case of Wikipedia for example, article titles typically are based on the way reliable English-language sources refer to the article's subject. When there is more than one appropriate title for an article, Wikipedia editors typically will choose the best title by consensus, based on multiple considerations, including recognizability, naturalness, precision, conciseness, and consistency. Accordingly, the present invention may be able to take advantage of the fact that article titles in Wikipedia (and similar knowledge bases) represent a consensus-based, continuously-refined, crowd-sourced accumulation of knowledge.

In some embodiments, the present invention allows for the fact that, in some cases, the most frequently used sense of the named entity is a slightly modified form of the named entity sought to be disambiguated. For example, the commonly used named entity may be a modified form of the original spotted term, based on changed capitalization and/or the addition or removal of prefixes, suffixes, pronouns, prepositions, conjunctions, and/or determiners. Accordingly, in some embodiments, the present invention provides for applying a set of predetermined modification to a named entity sought to be disambiguated, to generate a set of candidate named entities for disambiguation. The set of candidate named entities may then be matched against corresponding knowledge base articles, to find the most appropriate meaning. If one of the transformed forms of the named entity matches, e.g., a Wikipedia article in which the named entity is the title of the article, then such candidate named entity is deemed to be the most likely sense of that named entity.

For example, with reference to FIG. 1, in the utterance, "The technologies that achieve this depend on the systems which the mobile phone operator has adopted," the term "technologies" can be transformed into 'technology,' by removing the plural suffix 'ies' in favor of the singular form 'technology.' The term 'technology' may then be disambiguated to the corresponding Wikipedia article entitled "Technology" (https://en.wikipedia.org/wiki/Technology). Because the term 'technology' is also an article title, it is deemed to be the most likely sense of the spotted term 'technologies' in the above utterance. Similarly, the term "systems" can be transformed into 'system,' by removing the plural suffix 's.' The term 'system' can then be disambiguated to the Wikipedia article for 'system' as the most likely sense of the spotted term (https://en.wikipedia.org/wiki/System).

In some embodiments, the present invention may be used as a standalone mention detection application, employing a simple n-gram approach to term spotting, subject to one or more filtering rules.

In other embodiments, the present invention may employ one or more of several known phrase spotting methods, such as TagMe (see P. Ferragina and U. Scaiella. Fast and accurate annotation of short texts with Wikipedia pages. IEEE Software 29(1), 2012); DBPEdia SpotLight (see J. Daiber, M. Jakob, C. Hokamp, and P. N. Mendes. Improving efficiency and accuracy in multilingual entity extraction. In Proceedings of the 9th International Conference on Semantic Systems (I-Semantics), 2013); the IBM® Watson® Natural Language Understanding service (available at www.ibm.com/watson/services/natural-language-understanding); and/or others. In yet other embodiments, the present method may be incorporated as a disambiguation stage of another mention detection application. For example, the present invention may be embedded as a stage in a mention detection method further employing contextual data regarding the input text. In such embodiments, resolved named entities using the present method may be used as anchor spots for disambiguating named entities which could not resolved by the present method.

Figure 2:
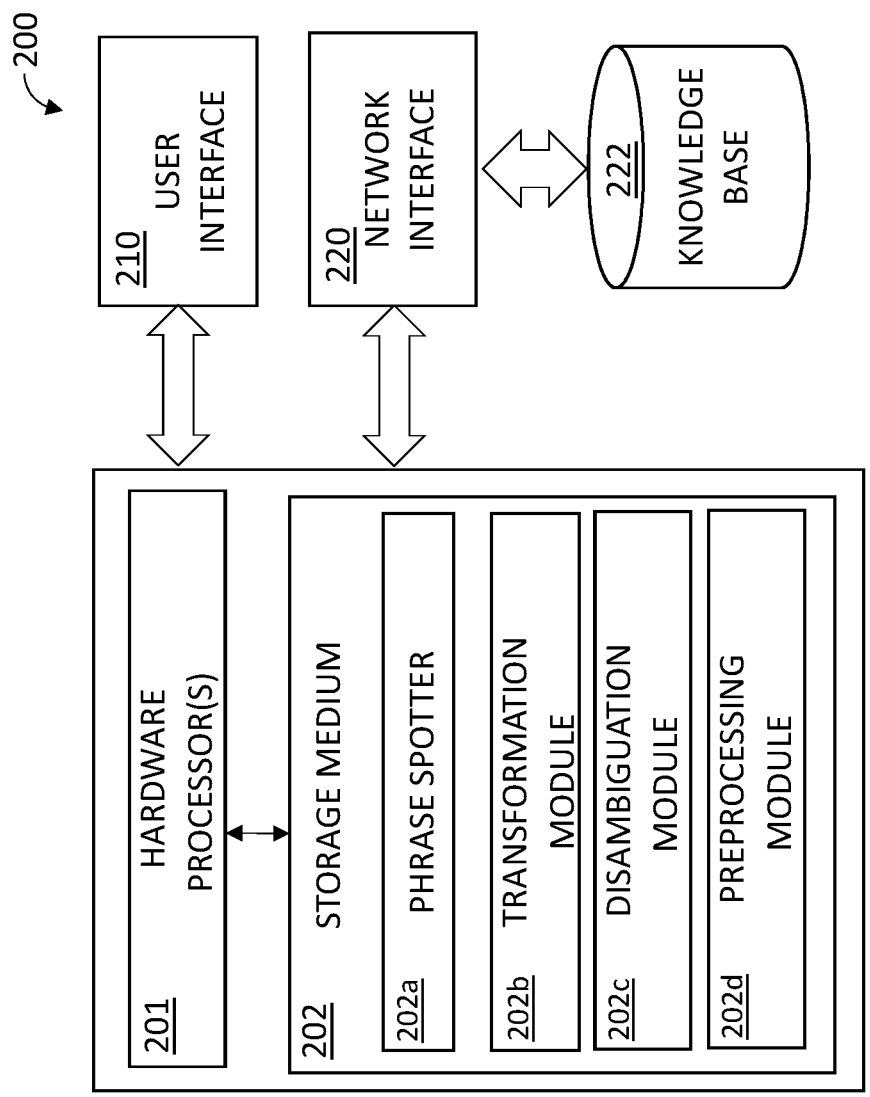
FIG. 2 shows schematically a system for disambiguating a spotted term in an input text to its most appropriate meaning in a knowledge base, according to an embodiment.

Reference is now made to FIG. 2, which shows schematically a system 200 for disambiguating a spotted named entity in an input text to its most appropriate meaning in a knowledge base. System 200 comprises one or more hardware processors 201, a non-transitory computer-readable storage medium 202, a user interface 210, and a network interface 220. Network interface 220 is connected to a network for communication, e.g., with a knowledge base 222. Storage medium 202 has encoded thereon program code comprising processor instructions. When the specific processor instructions disclosed are executed on hardware processor(s) 201, hardware processor(s) 201 is configured to execute certain non-conventional actions. As such, the program code is said to be configured to instruct actions on hardware processor(s) 201, such as by a software module.

In some embodiments, the program instructions are segmented into one or more software modules, which may comprise phrase spotter 202a, transformation module 202b, disambiguation module 202c, and preprocessing module 202d.

In some embodiments, an unstructured segment of text is input into phrase spotter 202a, e.g., through user interface 210. As noted above, in some embodiments, phrase spotter 202a may be configured to employ a known phrase spotting application. In other embodiments, phrase spotter 202a may be configured to performs an n-gram tokenization with respect to the input text, such that the result is a plurality of candidate spots identified within the input text. In some embodiments, phrase spotter 202a may be configured to apply varying n-gram lengths. After applying n-gram tokenization, phrase spotter 202a may further be configured to apply one or more filters to the identified candidate spots, based on one or more predefined filter rules. For example, phrase spotter 202a may be configured to apply filters which remove spots beginning and/or ending in punctuation marks; spots comprising a single letter; spots containing only 'stop' words (e.g., short function words such as the, is, at, which, and on); spots containing dates; spots containing only punctuation marks; spots comprising prepositions (e.g., in, at, on, of, by, and is) and/or articles (a, an, the); and/or spots which begin and/or end with '-'. In some embodiments, additional and/or different filter rules may be applied by phrase spotter 202a. In some embodiments, phrase spotter 202a may be configured for detecting correct boundaries of a spot and resolving overlapping spots and inclusions (e.g., "United states of America" should be disambiguated as an intact named entity, rather than broken down into its constituent phrases "United States" and "America").

System 200 may then be configured to submit the resulting list of spotted named entities from phrase spotter 202a to transformation module 202b. Transformation module 202b may be configured to transform the list of spotted tokens, by modifying each one based on one or more transformation rules, to generate a set of candidate named entities for disambiguation. For example, transformation module 202b may comprise a series of transformation rules, wherein each rule is applied successively to the set of tokens, to generate additional terms. Table 1 provides an exemplary set of rules R1-R7 which may be applied by transformation module 202b:

TABLE 1

Transformation Rules

| Rule | Transformation |
| --- | --- |
| R1 | Add terms by removing suffixes 's' and ''s' from last token |
| R2 | Add terms that replaces suffix 'ies' with 'y' in last token |
| R3 | Add terms by removing definite and indefinite articles 'the', 'a', 'an' |
| R4 | Add terms by capitalizing first letter of first token |
| R5 | Add terms by capitalizing first letter of first token and lowering other letters of first token |
| R6 | Add terms by capitalizing first letter of each token (except 'and', 'of', 'for') |
| R7 | Add terms by capitalizing first letter of each token and lowering all other letters (except 'and', 'of', 'for') |

In other embodiments, additional and/or different transformation rules may be applied by transformation module 202b.

In some embodiments, system 200 may be configured to transmit the resulting set of candidate named entities from transformation module 202b into a disambiguation module 202c. disambiguation module 202c may be configured to disambiguate the candidate named entities to a knowledge base 222. In some embodiments, knowledge base 222 may comprise any semantic knowledge base, such as Wikipedia.

In some embodiments, system 200 may comprise a preprocessing module 202d configured for performing an offline preprocessing of knowledge base 222, so as to eliminate certain classes of articles and/or create an offline representation of knowledge base 222, termed herein a 'spot-map.' For example, preprocessing module 202d may be configured to compile a 'blacklist' of terms which should be filtered from the set of candidate named entities, such as domain-specific terms (e.g., movie of book names), dates, number, terms which mostly appear as verbs, etc. In other embodiments, preprocessing module 202d may be configured for eliminating terms from known idioms (e.g., e.g., "any form", "on the other hand"). In yet other embodiments, preprocessing module 202d may be configured to compile a 'blacklist' of Uniform Resource Identifiers (URIs) of Wikipedia articles, such as those relating to disambiguation pages (as explained above, disambiguation pages are non-article pages which list articles covering topics that could have had the same title), pages with pre-defined categories, and/or linguistic-specific URIs.

In some embodiments, preprocessing module 202d may be configured to create an offline 'spot map' of knowledge base 222, comprising named entities and their corresponding disambiguation solutions in the knowledge base. For example, preprocessing module 202d may construct a dictionary or a dataset of named entities from knowledge base 222, along with the corresponding articles associated with the named entities included in the named entity dictionary and their interlinking structure.

In some embodiments, disambiguation module 202c may be configured to match each term in the set of candidate named entities from transformation module 202b against the spot-map created by preprocessing module 202d. In some embodiments, if one of the candidate named entities matches an article title in the spot-map, then disambiguation module 202c selects such article title as the relevant disambiguated meaning of the named entity. In some embodiments, if a candidate named entity match two or more corresponding titles in the spot map, then disambiguation module 202c may be configured to select the article with the highest number of in-links in knowledge base 222 as the most likely meaning of such named entity. If there are no candidate named entities which match against article titles, then disambiguation module 202c may be configured to check whether any of the candidate named entities matches a title of a redirect page (provided that the destination page is not itself a disambiguation page). Finally, in the absence of any redirected match, disambiguation module 202c may be configured to return a nil result for that named entity.

Once all candidate named entities have been resolved to a knowledge base 222 match, disambiguation module 202c may be configured to provide, as an output, an annotated text comprising links to knowledge base 222 articles for each spotted named entity in the input text. Accordingly, in some embodiments, disambiguation module 202c is configure for manipulating the unstructured text used as an input, such that at least one named entity spotted and disambiguated in it is linked via a hyperlink to the corresponding article in the knowledge base.

Figure 3:
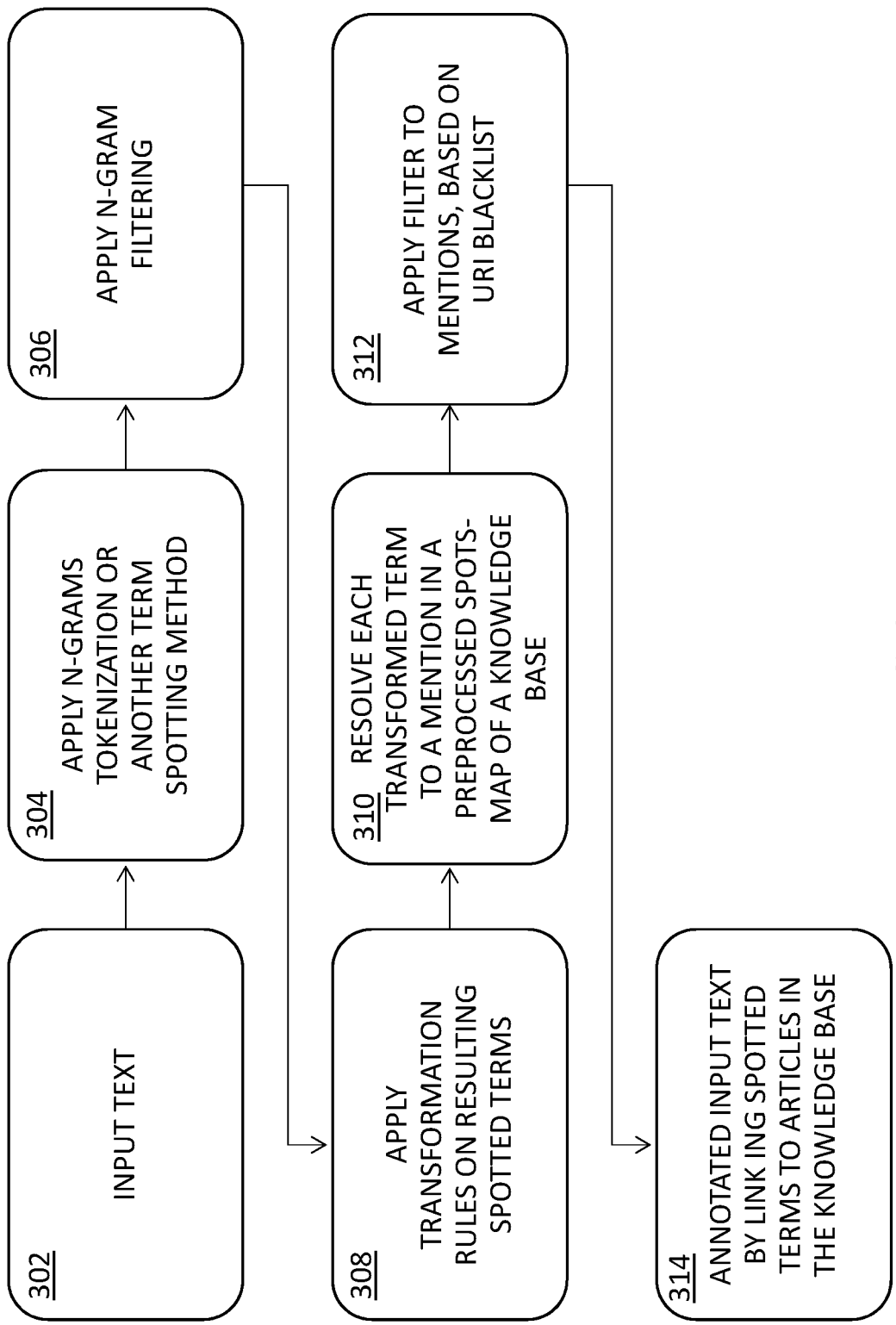
FIG. 3 is a flowchart of the operational steps carried out by a method for automated term disambiguation in an unstructured text based on a knowledge base, according to an embodiment.

FIG. 3 is a flowchart of the operational steps carried out by a method for automated term disambiguation in an unstructured text based on a knowledge base, according to an embodiment. At 302, an unstructured text is used as an input for the disambiguation process. At 304, a mention detection is performed with respect to the input text, e.g., by employing a simple n-gram approach. Accordingly, an n-gram tokenization process may be applied to acquire tokens from the input text. In other cases, as described above, other known mention detection methods may be employed. At 306, the resulting n-grams are filtered based on a plurality of filter rules, as well as a terms 'blacklist.' At 308, a transformation stage is applied to the resulting list of n-grams, to create a set of transformed terms based on a plurality of modifications rules. At 310, the transformed terms are resolved to a preprocessed spot-map created offline, as a representation of a knowledge base. At 312, the resulting list of mentions is filtered, e.g., based on a URI 'blacklist,' to eliminate disambiguation pages, etc. At 314, the resulting mentions are applied to the input text, to create an output of an annotated text comprising disambiguated terms. In some cases, the output text comprises hyperlinks linking each disambiguated term to its corresponding knowledge base article.

Experimental Results

Experiments conducted and described herein demonstrate the usability and efficacy of embodiments of the invention. Some embodiments of the invention may be configured based on certain experimental methods and/or experimental results; therefore, the following experimental methods and/or experimental results are to be regarded as embodiments of the present invention.

The present method was tested using a benchmark text corpus of 500 sentences comprising 2,718 Wikipedia mentions. Table 2 shows the performance of the present method as compared to the TagMe mention detection application referenced above.

TABLE 2

Experimental Results

| Wiki 500 sentences | Recall | Precision | F-score | Total mentions | Correct mentions |
|---|---|---|---|---|---|
| TagMe (no context) | 0.65 | 0.5 | 0.56 | 3576 | 1777 |
| TagMe (with context) | 0.58 | 0.59 | 0.59 | 2649 | 1575 |
| Present Method | 0.7 | 0.73 | 0.72 | 2602 | 1906 |

As can be seen, TagMe (without employing contextual computations) has an F-score of 0.56 with a relatively low precision score of 0.5. When using TagMe with contextual computations (using its default coherence confidence of 0.1), its F-score improves a bit to 0.59 and so is the precision, but the recall value decreases because the context causes filtering of some mentions that do not pass the coherence threshold. By comparison, the present method, which does not employ contextual computations, performs better than TagMe in all measures, including recall, precision, and F-score.

The computational efficiency of the present invention was tested by embedding it as a disambiguation stage of mention detection application TagMe referenced above. The combination of TagMe and the present invention was tested on annotating a full Wikipedia 2015 data dump consisting of 12 GB of data, and resulting in approximately 635 million mentions. The computational stage took approximately 1.5 hours using a single Linux-based computer comprising 14 processors in each of 2 cores and a total mem of 60 Gb. Annotating a larger corpus of 600 Gb using the present method took approximately 41 hours, compared with 22 days using TagMe.

The present invention may be a system, a method, and/or a computer program product. The computer program product may include a computer readable storage medium (or media) having computer readable program instructions thereon for causing a processor to carry out aspects of the present invention. All the input discussed above may be received digitally, such as in the form of a digital text file, a digitally-transmitted message, and/or the like.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    operating at least one hardware processor for:
        receiving, as input, a text which includes at least one named entity;
        modifying said named entity based on a plurality of modification rules, to generate a set of candidate named entities corresponding to said named entity;
        attempting to match each of the candidate named entities with titles of articles in a knowledge base of articles, to identify, for at least one of the candidate named entities, an article whose title matches the at least one candidate named entity; and
        manipulating the text such that the at least one named entity included therein is a hyperlink to the article in the knowledge base.

2. The method of claim 1, further comprising operating said at least one hardware processor for recognizing the at least one named entity by spotting n-grams in the input text, based on one or more specified n-gram lengths.

3. The method of claim 2, further comprising operating said at least one hardware processor for reducing a number of said n-grams in said input text, by applying one or more filters selected from the group consisting of: eliminating n-grams that begin or end with a stop word, eliminating n-grams that cross a comma, eliminating n-grams comprising a grammatical article, eliminating n-grams that begin with a hyphen, and eliminating n-grams that end with a hyphen.

4. The method of claim 1, wherein said modification rules are selected from the group consisting of: removing plural suffixes; removing possessive suffixes; removing definite and indefinite articles; using synonyms and/or antonyms; and capitalizing and/or decapitalizing various combinations of letters in the named entity.

5. The method of claim 1, wherein said identifying comprises identifying a first article which redirects to said article.

6. The method of claim 1, wherein said knowledge base comprises at least two articles corresponding to said candidate named entity, and wherein said identifying is based, at least in part, on scoring each of said at least two articles based on a number of links to each of said articles in other articles in the knowledge base.

7. The method of claim 1, further comprising operating said at least one hardware processor for constructing an offline representation of said knowledge base, said offline representation comprising a set of named entities and links to their corresponding articles within said knowledge base, wherein said identifying comprises identifying an article in said offline representation.

8. The method of claim 1, wherein said knowledge base is a crowd-sourced knowledge base.

9. The method of claim 8, wherein said knowledge base comprises a structured semantic representation of another knowledge base.

10. The method of claim 9, wherein said knowledge base is selected from the group consisting of Wikipedia, DBpedia, and Yago2.

11. The method of claim 1, wherein, in said knowledge base, said titles of said articles are selected based, at least in part, on a crowd-sourced consensus-based selection methodology, wherein said consensus-based selection methodology is further based, at least in part, on one or more considerations selected from the group consisting of: recognizability, naturalness, precision, conciseness, and consistency.

12. A system comprising:
   at least one hardware processor; and
   a non-transitory computer-readable storage medium having stored thereon program instructions, the program instructions executable by the at least one hardware processor to:
      receive, as input, a text which includes at least one named entity,
      modify said named entity based on a plurality of modification rules to generate a set of candidate named entities corresponding to said named entity,
      attempt to match each of the candidate named entities with titles of articles in a knowledge base of articles, to identify, for at least one of the candidate named entities, an article whose title matches the at least one candidate named entity, and
      manipulate the text such that the at least one named entity included therein is a hyperlink to the article in the knowledge base.

13. The system of claim 12, wherein said program instructions are further configured to:
   recognize the at least one named entity by spotting n-grams in the input text, based on one or more specified n-gram lengths; and
   reduce a number of said n-grams in said input text, by applying one or more filters selected from the group consisting of: eliminating n-grams that begin or end with a stop word, eliminating n-grams that cross a comma, eliminating n-grams comprising a grammatical article, eliminating n-grams that begin with a hyphen, and eliminating n-grams that end with a hyphen.

14. The system of claim 12, wherein said modification rules are selected from the group consisting of: removing plural suffixes; removing possessive suffixes; removing definite and indefinite articles; using synonyms and/or antonyms; and capitalizing and/or decapitalizing various combinations of letters in the named entity.

15. A computer program product comprising a non-transitory computer-readable storage medium having program instructions embodied therewith, the program instructions executable by at least one hardware processor to:
   receive, as input, a text which includes at least one named entity,
   modify said named entity based on a plurality of modification rules to generate a set of candidate named entities corresponding to said named entity,
   attempt to match each of the candidate named entities with titles of articles in a knowledge base of articles, to identify, for at least one of the candidate named entities, an article whose title matches the at least one candidate named entity, and
   manipulate the text such that the at least one named entity included therein is a hyperlink to the article in the knowledge base.

16. The computer program product of claim 15, wherein said program instructions are further configured to:
   recognize the at least one named entity by spotting n-grams in the input text, based on one or more specified n-gram lengths; and
   reduce a number of said n-grams in said input text, by applying one or more filters selected from the group consisting of: eliminating n-grams that begin or end with a stop word, eliminating n-grams that cross a comma, eliminating n-grams comprising a grammatical article, eliminating n-grams that begin with a hyphen, and eliminating n-grams that end with a hyphen.

17. The computer program product of claim 15, wherein said modification rules are selected from the group consisting of: removing plural suffixes; removing possessive suffixes; removing definite and indefinite articles; using synonyms and/or antonyms; and capitalizing and/or decapitalizing various combinations of letters in the named entity.

* * * * *